Sept. 15, 1942.   R. J. ROSEMAN   2,296,188
GARMENT FASTENER
Filed July 12, 1941    2 Sheets-Sheet 2
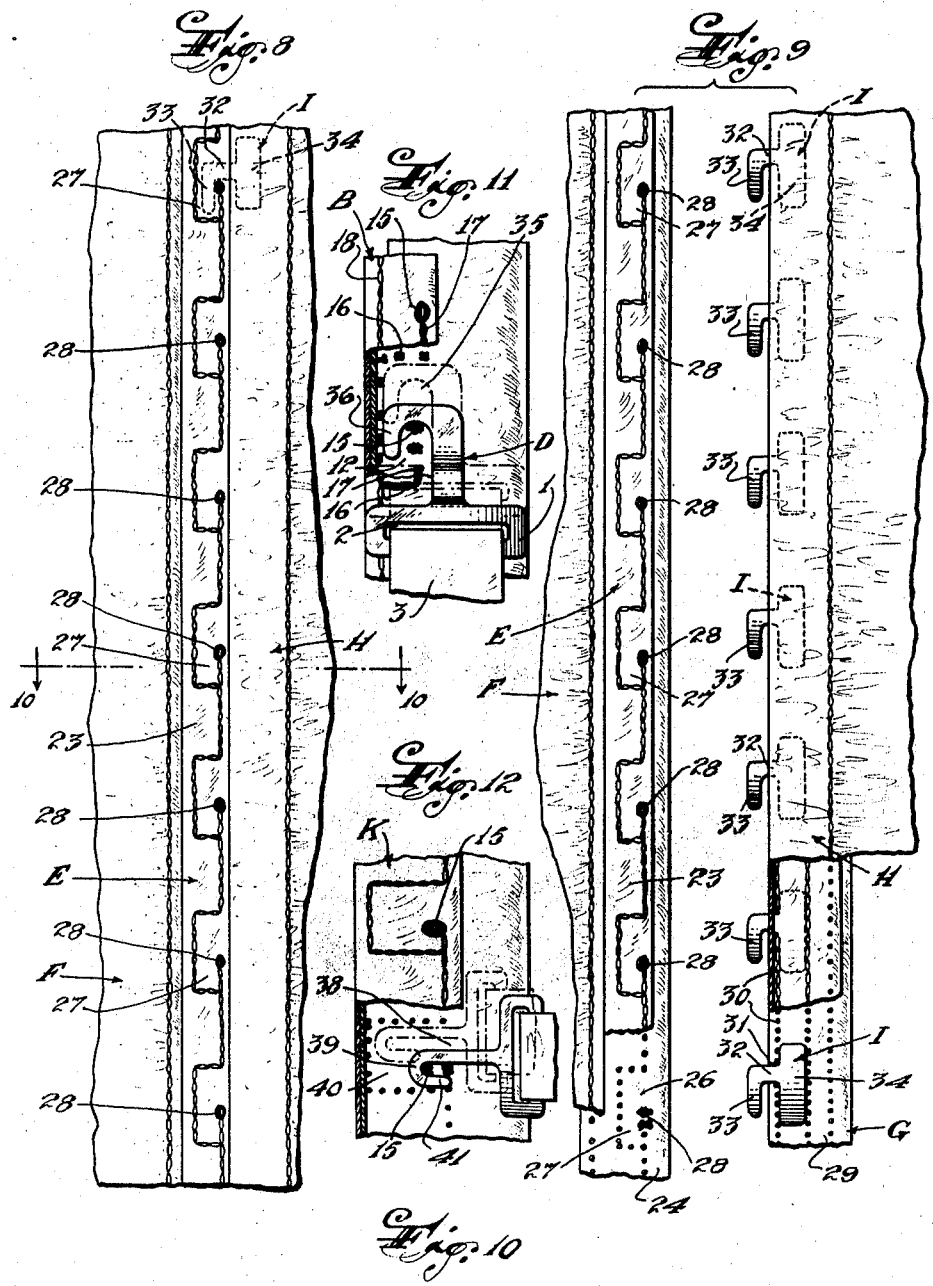
INVENTOR
Richard J. Roseman,
BY
Harry B. Rook,
ATTORNEY Patented Sept. 15, 1942

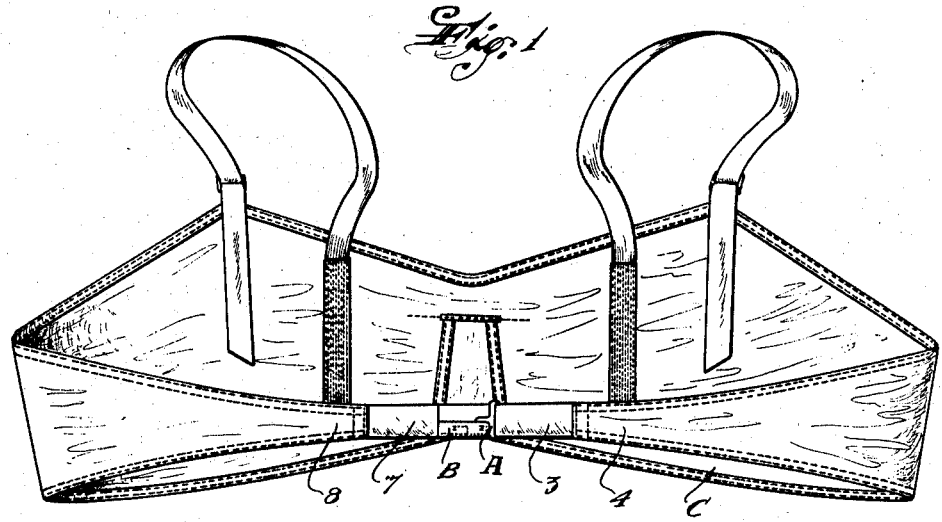

2,296,188

UNITED STATES PATENT OFFICE 2,296,188

GARMENT FASTENER

Richard J. Roseman, Newark, N. J.

Application July 12, 1941, Serial No. 402,053

10 Claims. (Cl. 24—206)

This invention relates in general to fasteners of the type which includes a hook to be attached to one of two parts to be fastened together, and a fastener element to be connected to the other of said parts and to cooperate with said hook for connecting the two parts together. The fastener may be used for different purposes, for example, to connect the edges of openings in garments such as brassières, girdles, aprons, etc., or for connecting any two parts of a garment or an article.

It is always desirable in garments, particularly undergarments, that fasteners shall comprise a minimum of metal and shall be thin, flat and flexible and of minimum bulk. At the present time, due to the scarcity of metals, a satisfactory fastener comprising no metal or a minimum of metal, is especially advantageous.

One of the problems encountered in forming a fastener without metal, is the provision of a structure that shall have adequate strength and durability, and which at the same time can be easily operated, especially when the fastener is located on a garment at the back of the wearer.

Accordingly a prime object of my invention is to provide a fastener of the general character described that shall have all of the above-mentioned desirable features and advantages, and more particularly to provide such a fastener that shall comprise a minimum of metal, shall be thin, flat, flexible and of minimum bulk, and shall be strong, durable and easy to operate.

Further objects are to provide a fastener of this character that shall include an approximately flat hook to be attached to one of the two parts to be connected, and a complemental fastener element to be connected to the other of said parts and that shall comprise at least two superposed plies of material connected together to receive said hook between them and having means connecting said two plies to be embraced by said hook upon insertion of the latter between the plies, for connecting said parts together; and to utilize in such a fastener a group of superposed stitches as means for connecting said two plies and to cooperate with the hook for connecting said parts together.

Other objects are to provide a separable fastener which shall include a hook and a complemental fastener element which shall comprise at least two superposed plies of material connected together to form a gap between one ply and the edge of the other ply and a pocket between the plies, so that the bill of said hook may be inserted endwise through said gap and into said pocket; to provide a structure whereby said bill of the hook shall be firmly frictionally held in said pocket against twisting so as to hold the hook against twisting in its own plane when the hook is inserted in said pocket; and to provide in such a fastener novel and improved means for preventing accidental unhooking or displacement of the hook from said pocket.

Further objects are to provide a fastener of the character described that shall be simple and inexpensive, which can be produced rapidly by automatic machines, which shall be pleasing in appearance; and to obtain other advantages and results as will be brought out by the following description in conjunction with the accompanying drawings in which Figure 1 is a rear elevational view of a brassière having applied thereto a fastener constructed in accordance with my invention.

Figure 2 is a plan view of the fastener shown on an enlarged scale and with the hook member and pocket member connected together.

Figure 3 is a view similar to Figure 2 with portions of the pocket member broken away and shown in section.

Figure 4 is a view similar to Figure 3 showing the manner of connecting and disconnecting the hook from the pocket member.

Figures 5 and 6 are transverse vertical sectional views on an enlarged scale taken on the lines 5—5 and 6—6, respectively, of Figure 2.

Figure 7 is a view similar to Figure 3 showing a modification of the invention.

Figure 8 is a fragmentary plan view of another form of the fastener particularly designed, for example, for use in a girdle or the like, showing the hook section and the pocket section of the fastener fastened together.

Figure 9 is a composite plan view of the fastener shown in Figure 8, showing the hook section and the pocket section disconnected and with portions of the hook section broken away.

Figure 10 is a horizontal sectional view on an enlarged scale, taken on the line 10—10 of Figure 8.

Figure 11 is a view similar to Figure 7 showing a modification of the invention, and Figure 12 is a view similar to Figure 2 showing another modification of the invention.

For the purpose of illustrating the principles of the invention, in Figures 1 to 7 inclusive I have shown the invention in the form especially adapted for use as an adjustable fastener for connecting the ends or edges of a garment such as a brassière, or wherever adjustability of the girth or length of a garment or article is desired.

The fastener is shown as comprising a hook A and a pocket member B to cooperate with the hook.

The hook is formed of any suitable material such as metal and has a base 1 formed with a slot 2 through which may be threaded a tape 3 for connecting the hook to one end 4 of a garment such as a brassière C. The hook also includes a shank 5 and a bill 6 which are arranged in substantially a common flat plane with the base 1, the shank 5 projecting from substantially the middle of the length of the base so as to be in approximate alignment with the longitudinal median line of the tape 3.

The pocket member B is in the form of a strip of suitable material such as fabric, one end of which may be connected as by a tape 7 to the other end 8 of the garment C. As shown, the pocket member comprises at least two superposed plies 9 and 10 of suitable material such as fabric, which are secured together to form one or more gaps 11 between one ply and one edge of the other ply and also to form one pocket 12 for each gap between said plies and inwardly of one end of the corresponding gap. The gap serves as a mouth for the pocket and has its edges in a plane perpendicular to the general plane of said member B.

More specifically, the pocket member comprises a strip of material that has its edge portions folded inwardly upon itself to form the plies 9 and 10 and is folded longitudinally intermediate its width as at 13 to bring the plies 9 and 10 into superposed relation to each other. If desired a reenforcing strip 14 is secured between the plies 9 and 10. Preferably the free edge of the ply 10 is disposed approximately along the longitudinal median line of the ply 9 as shown in Figure 2 and means such as a plurality of superposed stitches 15 are connected to both of said plies and extend from one to the other thereof adjacent the edge of the ply 10. Preferably the stitches 15 penetrate all of the plies of the strip of which the pocket member B is formed, so as to provide a maximum of strength.

Each group of stitches 15 forms one end of a gap 11, and the other end of each gap is formed by a line of stitches 16 extending transversely of the pocket member, and a line 17 of stitches extending between the stitches 16 and the group of stitches 15 parallel and adjacent to the edge of the ply 10. Another line of stitches 18 extends along the fold 13 of the pocket member so as to connect all of the plies at said fold and form the pocket 12 between the plies 9 and 10 and the stitches 16, 17, 18.

In operation of the fastener, to connect the hook to the pocket member B, the hook is slightly twisted in its own plane and the bill of the hook is slipped through one of the gaps 11 as shown in Figure 4, whereupon the hook is then twisted so that its base 1 is approximately transverse of the pocket member and the bill of the hook is pulled downwardly into the pocket 12 as shown by solid lines in Figure 3.

The space between the groups of stitches 15 and the line of stitches 18 is preferably approximately equal to the width of the bill 6 of the hook so that said bill will be frictionally received between the plies 9 and 10. Also, the distance between each group of stitches 15 and the corresponding transverse stitches 16 of the same gap 11, is less than the length of the bill of the hook so that the stitches 16 will form an abutment to prevent accidental displacement of the hook from the pocket upon simple movement of the hook longitudinally of the pocket member, as shown by dot and dash lines in Figure 3.

It is also desirable that the inner side of the end of the bill of the hook have a protuberance or hump 19 to engage behind the group of stitches 15 and further restrain the hook against accidental displacement from the pocket. Also, preferably the bill of the hook is of such length that its extremity will engage the bottom of the pocket or the stitches 16, when the hook is inserted in the pocket, as shown in Figure 7.

With this construction, it will be observed that the groups of stitches 15 effectively cooperate with the hook for connecting the hook and pocket member together, and the pocket member is wholly devoid of metal.

It will also be observed that the edge of the ply 10 forms a channel or groove 20 between itself and the ply 9 to serve as a guide along which the bill of the hook may be slid as a guide for directing the bill of the hook into the gaps. This is especially advantageous where the fastener is used at the back of a garment, in that the hook may be connected to the pocket member through the sense of touch of the wearer. The hook will slide freely along the channel in one direction, slipping over the gaps, but the bill of the hook will easily slip into one of the gaps upon movement of the hook in the other direction.

The pocket member B can be formed rapidly in automatic machines which will eliminate jump stitches over the gaps 11 and also eliminate jump stitches between the groups of stitches 15 and the line 18, so that there is a minimum of possibility of breaking of stitches and consequent weakening of the pocket member as the result of inserting and removing the hook from the pockets. The absence of metal makes the pocket member relatively inexpensive, soft, thin and flexible, and also facilitates laundering of the pocket member.

All portions of the hook being in a common flat plane and the pocket member being adapted to lie flat against the body of the wearer of the garment to which the fastener is attached, there is no likelihood of the bill of the hook "digging into" the body of the wearer and causing discomfort.

A modification of the invention is shown in Figure 7 wherein the pocket member B is substantially identical with that hereinbefore described, but the hook D has a straight bill 21 that is approximately parallel with the shank 22 and extends substantially the full length of the pocket 12. With this construction, when the hook is connected to the pocket member, the bill 21 will be confined in the pocket so as to restrain twisting of the hook in its own plane. This is particularly important when the fastener is used on a garment like the brassière C shown in Figure 1, where it is desirable that pivotal motion between the hook and the pocket member be prevented so as to hold the ends of the garment in substantial alignment with each other and thereby prevent twisting or displacement of the garment on the wearer.

In Figures 8 to 10 inclusive, I have shown a form of the fastener adapted for use on girdles or the like where it is desired to separably connect together two long edges of the garment.

In this form of the invention, the pocket section E is in general the same as the pocket member B and comprises a strip to be connected to and extend along one longitudinal edge portion F of the garment. More conveniently, the strip is formed of two sections 23 and 24 that are disposed in superposed relation to each other and secured together to form a plurality of gaps 26 between the corresponding free edges of the sections and a pocket 27 for each gap. At one end of each gap is a group of stitches 28 corresponding to the group of stitches 15.

The hook section G of the fastener comprises a strip 29 the free edge of which is connected by stitches 30 to the free edge of the other edge portion H of the garment; and the bases 34 of the hooks I are secured between the strip 29 and the edge portion H. The stitches 30 are so formed as to provide gaps 31 between the strip 29 and the edge portion H through each of which projects the shank 32 of one of the hooks so that the bills 33 of the hooks extend outwardly beyond the edges of the strip 29 and edge portion H and approximately parallel to the edges of said strip and garment edge portion.

In operation of the fastener, the hooks are connected to the pocket section in substantially the same manner as are the hooks A and D connected to their corresponding pocket member B, the strip 29 and corresponding edge portion H being slightly flexed to permit insertion and removal of the bills of the hooks through the respective gaps.

The bills of the hooks are longer than the gaps so that the shanks of the hooks will abut the stitches at the ends of the pockets opposite the groups of stitches 28 upon simple relative longitudinal movement of the two sections of the fastener, whereby to prevent accidental disconnection of the hooks from the pockets.

If it is desired to avoid twisting of the hook for inserting the hook into the pocket, the gap indicated at 35 in Figure 11 may be of a length greater than the length of the bill of the hook, or conversely, the bill of the hook may be made of a length less than that of the gap, so that the bill 36 of the hook may be inserted laterally through the gap as shown by dot and dash lines in Figure 11, after which the hook may be manipulated to move the bill longitudinally so as to cause the hook to embrace the superposed stitches 15.

Also, if desired the pocket may be arranged on the pocket member and the gap may be of such length as to receive the hook endwise as shown by dot and dash lines in Figure 12. As shown, the gap 38 which corresponds to the gap 11 is somewhat wider than the end 39 of the hook so that the hook may be slipped endwise through the gap, then moved laterally into the pocket 40 of the pocket member K, and then manipulated to move the bill 41 of the hook longitudinally to cause the hook to embrace the superposed stitches 15.

Various other modifications and changes in the details of structure of the fastener will appear to those skilled in the art as within the spirit and scope of the invention.

Having thus described my invention, what I claim is:

1. A separable fastener comprising two parts to be connected, a hook secured upon one part and having a shank and a bill in spaced and opposed relation to said shank, the other of said parts including at least two superposed plies of material connected together to form a gap between one ply and one edge of the other ply through which said hook bill may be inserted, and a group of superposed stitches at one end of said gap connected to both of said plies and extending therebetween, there being a pocket between said plies extending beyond said end of said gap to snugly receive said bill as it is inserted through said gap, whereby said hook may embrace said superposed stitches to connect said parts together and said pocket will restrain said hook against rotation about said stitches.

2. A separable fastener comprising two parts to be connected, a hook secured upon one of said parts and including a shank and a bill in spaced opposed relation to said shank, the other of said parts including at least two superposed plies of material connected together at points spaced longitudinally thereof to form a gap between one ply and one edge of the other ply so that the portion of said edge of the second-mentioned ply between said points of connection of the plies at the ends of said gap permanently is free from and above the adjacent side of the first-mentioned ply to permit insertion of said hook bill through said gap, and means connected to both of said two plies and extending between them at one end of said gap to be embraced by said hook upon insertion of the hook between said plies for connecting said parts together.

3. A separable fastener comprising two parts to be connected, a hook secured upon one of said parts and including a shank and a bill in spaced opposed relation to said shank, the other of said parts including at least two superposed plies of material connected together by stitches at points spaced longitudinally thereof to form a gap between one ply and one edge of the other ply so that the portion of said edge of the second-mentioned ply between said points of connection of the plies at the ends of said gap permanently is free from and above the adjacent side of the first-mentioned ply to permit insertion of said hook bill through said gap, there being a group of superposed stitches at one end of said gap to be embraced by said hook upon insertion of the hook between said plies for connecting said parts together.

4. A separable fastener comprising two parts to be connected, a hook secured upon one of said parts and including a shank and a bill in spaced opposed relation to said shank, the other of said parts including at least two superposed plies of material connected together to form a pocket between them, said plies being connected together at spaced points along one edge of one ply to form a gap between said edge and the other ply to serve as a mouth for said pocket, the portion of said edge of the first-mentioned ply between the ends of said gap being permanently free from and out of the general plane of the adjacent side of the second-mentioned ply to permit insertion of said hook bill through said gap into said pocket and said pocket extending longitudinally of said plies beyond one end of said gap, and a group of superposed stitches connected to both of said plies and extending between them at said end of said gap so that when said hook is inserted through said gap the hook will embrace said superposed stitches to connect said two parts and said hook bill will be enclosed within said pocket.

5. A separable fastener comprising two parts to be connected, a hook secured upon one of said parts and including a shank and a bill in spaced opposed relation to said shank, the other of said parts including at least two superposed plies of material connected together to form a pocket between them, said plies being connected together at spaced points along edge of one ply to form a gap between said edge and the other ply to serve as a mouth for said pocket, the portion of said edge of the first-mentioned ply between the ends of said gap being permanently free from and out of the general plane of the adjacent side of the second mentioned ply to permit insertion of said hook bill through said gap into said pocket and said pocket extending longitudinally of said plies beyond one end of said gap, and means connecting said two plies and extending between them at said end of said gap so that the bill of said hook may be inserted through said gap and enclosed in said pocket and the hook may embrace said means to connect said two parts together.

6. The separable fastener set forth in claim 4 wherein said pocket is constricted inwardly of said mouth so that the walls of the pocket will frictionally engage the end of the bill of said hook to hold the hook against accidental displacement from the pocket.

7. A separable fastener comprising two parts to be connected, a substantially flat hook secured upon one of said parts and including a shank and a bill in spaced opposed relation to said shank, the other of said parts including at least two superposed plies of material connected together to form a plurality of pockets between them and spaced longitudinally thereof, said plies being connected at spaced points along one edge of one ply to form a plurality of gaps, one for each pocket, between said edge and the other ply, the portions of said edge of the first-mentioned ply between the ends of each gap being free from and out of the general plane of the adjacent side of the second-mentioned ply to permit insertion of said hook bill through said gaps into said pockets, and a group of superposed stitches for each pocket and secured to said plies and extending transversely of the corresponding pocket so that when said hook is inserted through the corresponding gap the hook will embrace said superposed stitches to connect said two parts and said hook bill will be enclosed within said pocket.

8. The separable fastener set forth in claim 7 wherein the first-mentioned ply extends beyond said edge of the second-mentioned ply and the second-mentioned ply is secured to the first-mentioned ply between said pockets and inwardly of said edge, whereby a channel is formed between said first-mentoined ply and said edge of the second-mentioned ply in which said hook bill may be slid to guide it into said pockets.

9. A separable fastener comprising two parts to be connected, a substantially flat hook secured upon one of said parts and including a shank and a bill in spaced opposed relation to said shank, the other of said parts including at least two superposed plies of material, a plurality of lines of stitches extending along one edge of one ply and securing said plies together, said lines being spaced apart longitudinally of said edge to form gaps between said edge and the other ply, the portions of said edge between said lines of stitches being free from and out of the general plane of the adjacent side of the other ply to permit insertion of said hook bill through said gaps, and a group of superposed stitches at one end of each gap to be embraced and engaged by said hook for connecting said two parts together when the hook is inserted into said gap.

10. A separable fastener comprising two parts to be connected, a hook secured upon one of said parts and including a shank and a bill in spaced opposed relation to said shank, the other of said parts including at least two superposed plies of material connected together at points spaced longitudinally thereof to form a plurality of gaps between one ply and one edge of the other ply so that the portions of said edge of the second-mentioned ply between the ends of each gap permanently is free from and out of the general plane of the adjacent side of the first-mentioned ply to permit insertion of said hook bill through said gaps and means connecting said two plies and extending between them at one end of each gap to be embraced by said hook upon insertion of the hook through said gap, said first-mentioned ply extending beyond said edge of the second-mentioned ply and said second-mentioned ply being secured to the first-mentioned ply between said gaps and inwardly of said edge of the second-mentioned ply to form a channel between said edge and said first-mentioned ply in which said hook bill may be slid to guide it into said gaps.

RICHARD J. ROSEMAN.